United States Patent
Kapoor et al.

(10) Patent No.: US 9,959,295 B1
(45) Date of Patent: May 1, 2018

(54) S-EXPRESSION BASED COMPUTATION OF LINEAGE AND CHANGE IMPACT ANALYSIS

(71) Applicant: Numerify, Inc., Cupertino, CA (US)

(72) Inventors: Rahul Kapoor, Sunnyvale, CA (US); Sunny Tulsi Sreedhar Murthy, Bangalore (IN)

(73) Assignee: Numerify, Inc., San Jose, CA (US)

( * ) Notice: Subject to any disclaimer, the term of this patent is extended or adjusted under 35 U.S.C. 154(b) by 381 days.

(21) Appl. No.: 14/882,202

(22) Filed: Oct. 13, 2015

(51) Int. Cl.
*G06F 17/30* (2006.01)

(52) U.S. Cl.
CPC .. *G06F 17/30292* (2013.01); *G06F 17/30327* (2013.01); *G06F 17/30427* (2013.01)

(58) Field of Classification Search
CPC ......... G06F 17/30569; G06F 17/30427; G06F 17/3043; G06F 17/30292
See application file for complete search history.

(56) References Cited

U.S. PATENT DOCUMENTS

| | | | |
|---|---|---|---|
| 7,987,159 B2 | 7/2011 | Gopal et al. | |
| 9,280,332 B2* | 3/2016 | Koseki | G06F 8/51 |
| 2007/0038985 A1* | 2/2007 | Meijer | G06F 8/51 |
| | | | 717/137 |
| 2011/0295791 A1* | 12/2011 | Venkatasubramanian | G06F 17/30563 |
| | | | 707/600 |

OTHER PUBLICATIONS

GSP General SQL Parser Professional SQL engine for various databases, "Parsing, formatting, modification and analysis", SQL Parse!, Analyze, Transform and Format All in One, pp. 1-2, printed Nov. 20, 2015, URL: http:// sqlparser.com. Gudu Software 2002-2015.
Microsoft Corporation, "Language Integrated Query" (.NET Framework) from Wikipedia, the free encyclopedia, pp. 1-9, printed Nov. 20, 2015, URL: https://en.wikipedia.org/w/index.php?title=Language_Integrated_Query&oldid=672255809. Released Nov. 19, 2007; Last modified Jul. 20, 2015.
Rosenberg, Kevin M., "CLSQL" from Wikipedia, the free encyclopedia, 1 page, printed Nov. 20, 2015, URL: https://en.wikipedia.org/w/index.php?title=CLSQL&oldid=659923182. Created in 2001; Released Mar. 30, 2015; Last modified Apr. 29, 2015.

* cited by examiner

*Primary Examiner* — Angelica Ruiz
(74) *Attorney, Agent, or Firm* — Rahman LLC

(57) ABSTRACT

Systems and processor-implemented methods of S-expression based computation of lineage and change impact analysis. An SQL expression is converted into an S-expression tabular structure. A function table including a plurality of functions associated with S-expression tabular structure tabulated against at least one of a function name, a derived column and a derived table and an argument table including plurality of arguments associated with the S-expression tabular structure tabulated against at least one of an argument type, a function identifier linking the arguments to the function table, a computed from function, a reference to entity or a literal value, is generated based on the S-expression tabular structure. At least one of lineage or change impact analysis for an entity is determined based on the function table and the argument table, where lineage provides a provenance of the entity or attribute from a source entity or a source attribute.

20 Claims, 10 Drawing Sheets

| COLUMN | DERIVED FROM | DERIVED FROM FUNCTION | CONTRIBUTES TO | CONTRIBUTES TO FUNCTION | JOIN CONDITION |
|---|---|---|---|---|---|
| X | NULL | NULL | Z,X' | SUM(X,Y,) SUM (1,SQRT(X)) | NULL |
| Y | NULL | NULL | Z | SUM (X,Y) | NULL |
| Z | X,Y | SUM (X,Y) | P | SQUARE (Z) | NULL |
| P | Z | SQUARE (Z) | R | MULT (P,Q) | NULL |
| Q | NULL | NULL | R | MULT (P,Q) | NULL |
| R | P,Q | MULT (P,Q) | NULL | NULL | NULL |
| X' | X | SUM (1,SQRT(X)) | NULL | NULL | NULL |

FIG.1

| COLUMN | DERIVED FROM | DERIVED FROM FUNCTION | CONTRIBUTES TO | CONTRIBUTES TO FUNCTION | DERIVED FROM JOIN CONDITION |
|---|---|---|---|---|---|
| Z | T3.X, T4.Y | SUM(T3.X,T4.Y) | T2.P | SQUARE(Z) | T3-T4 JOIN CONDITION |
| T2.P | Z | SQUARE(Z) | T.R | MULT(T2.P,T1.Q) | T3-T4 JOIN CONDITION |
| T.R | T2.P, T1.Q | MULT(T2.P,T1.Q) | NULL | NULL | T1-T2 JOIN CONDITION |

FIG.2

| ITEM | L0 | L1 | L2 | L3 | L4 | L5 |
|---|---|---|---|---|---|---|
| 1. | AS | | | | | |
| 2. | | SELECT | | | | |
| 3. | | | AS | | | |
| 4. | | | | EXPRESSION FUNCTIONS EX. SUM, MULT, SQRT... | | |
| 5. | | | | | AS ( RECURSIVE LIKE ITEM 3) | |
| 6. | | FROM | | | | |
| 7. | | | AS (RECURSIVE LIKE ITEM 1 AS NESTED TABLES ARE DEFINED USING SELECT, FROM, WHERE ) | | | |
| 8. | | | JOIN | | | |
| 9. | | WHERE | | | | |
| 10. | | | AND | | | |
| 11. | | | OR | | | |
| 12. | | | | CONDITIONALS EX. > < >= <= = | | |
| 13. | | | | | EXPRESSION AS IN ITEM 4 | |
| 14. | | | | | | AS ( RECURSIVE LIKE ITEM 3) |
| 15. | | GROUP BY | | | | |
| 16. | | HAVING | | | | |
| 17. | | | AND | | | |
| 18. | | | OR | | | |
| 19. | | | | CONDITIONALS EX. > < >= <= = | | |
| 20. | | | | | EXPRESSION AS IN ITEM 4 | |
| 21. | | | | | | AS ( RECURSIVE LIKE ITEM 3) |

FIG. 4

| ID | FUNCTION NAME | DERIVED COLUMN | DERIVED TABLE |
|---|---|---|---|
| F1 | AS | | T |
| F2 | SELECT | | T |
| F3 | AS | R | |
| F4 | MULT | R | |
| F5 | AS | X' | |
| F6 | SUM | X' | |
| F7 | SQRT | X' | |
| F8 | FROM | | T |
| F9 | JOIN | | T |
| F10 | AS | | T2 |
| F11 | SELECT | | T2 |
| F12 | AS | T2.X | |
| F13 | AS | Z | |
| F14 | SUM | Z | |
| F15 | AS | T2.P | |
| F16 | SQUARE | T2.P | |
| F17 | FROM | | T2 |
| F18 | JOIN | | T2 |
| F19 | WHERE | | T2 |
| F20 | WHERE | | T |

FIG.5A

| ID | TYPE | FUNCTION ID | COMPUTED FROM FUNCTION | REFERENCE TO ENTITY | LITERAL VALUE |
|---|---|---|---|---|---|
| A1 | DERIVED TABLE | F1 | | T | |
| A2 | COMPUTED | F1 | F2 | | |
| A3 | COMPUTED | F1 | F8 | | |
| A4 | COMPUTED | F1 | F20 | | |
| A5 | COMPUTED | F2 | F3 | | |
| A6 | COMPUTED | F2 | F5 | | |
| A7 | DERIVED COLUMN | F3 | | R | |
| A8 | COMPUTED | F3 | F4 | | |
| A9 | DERIVED COLUMN | F4 | | T2.P | |
| A10 | BASE COLUMN | F4 | | T1.Q | |
| A11 | DERIVED COLUMN | F5 | | X' | |
| A12 | COMPUTED | F5 | F6 | | |
| A13 | LITERAL | F6 | | | 1 |
| A14 | COMPUTED | F6 | F7 | | |
| A15 | DERIVED COLUMN | F7 | | T2.X | |
| A16 | COMPUTED | F8 | F9 | | |
| A17 | BASE TABLE | F9 | | T1 | |
| A18 | COMPUTED | F9 | F10 | | |
| A19 | DERIVED TABLE | F10 | | T2 | |
| A20 | COMPUTED | F10 | F11 | | |
| A21 | COMPUTED | F10 | F17 | | |

FIG.5B

| ID | TYPE | FUNCTION ID | COMPUTED FROM FUNCTION | REFERENCE TO ENTITY | LITERAL VALUE |
|---|---|---|---|---|---|
| A22 | COMPUTED | F10 | F19 | | |
| A23 | COMPUTED | F11 | F12 | | |
| A24 | COMPUTED | F11 | F13 | | |
| A25 | COMPUTED | F11 | F15 | | |
| A26 | DERIVED COLUMN | F12 | | T2.X | |
| A27 | BASE COLUMN | F12 | | T3.X | |
| A28 | DERIVED COLUMN | F13 | | Z | |
| A29 | COMPUTED | F13 | F14 | | |
| A30 | BASE COLUMN | F14 | | T3.X | |
| A31 | BASE COLUMN | F14 | | T4.Y | |
| A32 | DERIVED COLUMN | F15 | | T2.P | |
| A33 | COMPUTED | F15 | F16 | | |
| A34 | DERIVED COLUMN | F16 | | Z | |
| A35 | COMPUTED | F17 | F18 | | |
| A36 | BASE TABLE | F18 | | T3 | |
| A37 | BASE TABLE | F18 | | T4 | |
| A38 | COMPUTED | F19 | T3-T4 JOIN COND. | | |
| A39 | COMPUTED | F20 | T1-T2 JOIN COND. | | |

FIG.5C

| DERIVED COLUMN | FUNCTION LIST |
|---|---|
| R | F4 |
| X' | F6,F7 |
| Z | F14 |
| T2.P | F16 |

FIG.6

| ENTITY | FUNCTION LIST |
|--------|---------------|
| T2.P   | F4            |
| T1.Q   | F4            |
| T2.X   | F7            |
| T3.X   | F12, F14      |
| Z      | F16           |
| T4.Y   | F14           |
| T1     | F9            |
| T2     | F9            |
| T3     | F18           |
| T4     | F18           |

FIG.7

S-EXPRESSION BASED COMPUTATION OF LINEAGE AND CHANGE IMPACT ANALYSIS

RELATED APPLICATION DATA

This application is related to U.S. non-provisional patent application Ser. No. 14/882,207, filed Oct. 13, 2015, entitled "LANGUAGE CONVERSION BASED ON S-EXPRESSION TABULAR STRUCTURE," the contents of which are hereby incorporated by reference for all purposes as if fully set forth herein.

BACKGROUND

Technical Field

The embodiments herein generally relate to database management systems, and, more particularly, to approaches for S-expression based computation of lineage and change impact analysis.

Description of the Related Art

Pursuant to an exemplary scenario, a relational database is a collection of related data organized in related two-dimensional tables of columns and rows such that information can be derived by performing set operations on the tables, such as join, sort, merge, and so on. A relational database typically includes multiple tables. A table may have several records and at least one field within each record. A record could include a row in the table that is identified by a unique record identifier. Database management system (DBMS), and in particular a relational database management system (RDBMS) is a control system that supports database features including, but not limited to, storing data on a memory medium, retrieving data from the memory medium and updating data on the memory medium.

Typically data stored in a relational database is accessed using a query constructed in a query language such as Structured Query Language ("SOL"). A SQL query is non-procedural in that it species the objective or desired result of the query in a language meaningful to a user but does not define the steps to be performed, or the order of the step's performance, to accomplish the query. Large conventional database systems provide a storehouse for data generated from a variety of locations and applications (often referred to as data ware houses or data marts).

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

A number of systems, processor-implemented methods, and non-transitory computer-readable mediums for S-expression based computation of lineage and change impact analysis are disclosed.

In one aspect, a non-transitory computer-readable medium carrying one or more sequences of instructions which, when executed by one or more processors, cause the one or more processors to execute a method of S-expression based computation of lineage and change impact analysis is disclosed. The method includes converting a SQL expression into an S-expression tabular structure. The S-expression includes a nested list data structure, and where each element of the nested list data structure is a list in itself. The processor implemented method further includes generating a function table based on the S-expression tabular structure, the function table including a plurality of functions associated with the S-expression tabular structure tabulated against at least one of a function name, a derived column and a derived table and an argument table based on the S-expression tabular structure. The argument table includes a plurality of arguments associated with the S-expression tabular structure tabulated against at least one of an argument type, a function identifier linking the arguments to the function table, a computed from function, a reference to entity or a literal value. The processor implemented method further includes determining at least one of lineage or change impact analysis for an entity of the nested list data structure based on the function table and the argument table, where the lineage provides a provenance of the entity or attribute from a source entity or a source attribute, and the change impact analysis is an analysis of an impact of a change in at least one of a source attribute, a source entity, an intermediate attribute or an intermediate entity to one or more downstream attributes or one or more downstream entities.

In another aspect, a system for S-expression based computation of lineage and change impact analysis is disclosed. The system includes a processor and a non-transitory computer readable storage medium including one or more modules executable by the processor. The modules include an S-expression conversion module, a function table module, an argument table module, a lineage module, and a change impact analysis module. The S-expression conversion module converts a SQL expression into an S-expression tabular structure, where the S-expression tabular structure includes a nested list data structure, and where each element of the nested list data structure is a list in itself. The function table module generates a function table based on the S-expression. The function table includes a plurality of functions associated with the S-expression tabular structure tabulated against at least one of a function name, a derived column and a derived table. The argument table module generates an argument table based on the S-expression. The argument table includes a plurality of arguments associated with the S-expression tabular structure tabulated against at least one of an argument type, a function identifier linking the arguments to the function table, a computed from function, a reference to entity or a literal value. The lineage module determines a lineage for an entity of the nested list data structure based on the function table and the argument table. The lineage provides a provenance of the entity or an attribute from a source entity or a source attribute respectively. The change impact analysis module determines a change impact analysis for the entity based on the function table and the argument table. The change impact analysis is an analysis of an impact of a change in at least one of a source attribute, a source entity, an intermediate attribute or an intermediate entity to one or more downstream attributes or one or more downstream entities.

In yet another aspect, a processor-implemented method of S-expression based computation of lineage and change impact analysis includes converting a SQL expression into an S-expression tabular structure. The processor-implemented method further includes generating a function table based on the S-expression, the function table including a plurality of functions associated with the S-expression tabular structure tabulated against at least one of a function name, a derived column and a derived table and an argument table based on the S-expression. The argument table includes a plurality of arguments associated with the S-expression tabular structure tabulated against at least one of an argument type, a function identifier linking the arguments to the function table, a computed from function, a reference to entity or a literal value. The processor implemented method further includes determining at least one of lineage or change impact analysis for an entity of the nested list data structure based on the function table and the argument table, where the lineage provides a provenance of the entity or attribute from a source entity or a source attribute, and the change impact analysis is an analysis of an impact of a change in at least one of a source attribute, a source entity, an intermediate attribute or an intermediate entity to one or more downstream attributes or one or more downstream entities.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 depicts a tabular representation of an information to be tracked to compute lineage and change impact analysis for an SQL expression, in accordance with an exemplary scenario;

FIG. 2 depicts a join condition for a nested join transformation represented in tabular form, in accordance with an exemplary scenario;

FIG. 4 illustrates an exemplary tabular representation for converting SQL expression to S-expression tabular structure, in accordance with an embodiment;

FIG. 5A depicts an exemplary function table generated using S-expression tabular structure, in accordance with an embodiment;

FIGS. 5B-5C depicts an exemplary argument table generated using S-expression tabular structure, in accordance with an embodiment;

FIG. 6 depicts an exemplary pivoted function table, in accordance with an embodiment;

FIG. 7 depicts an exemplary pivoted argument table, in accordance with an embodiment.

DETAILED DESCRIPTION OF PREFERRED EMBODIMENTS

Figure 3:
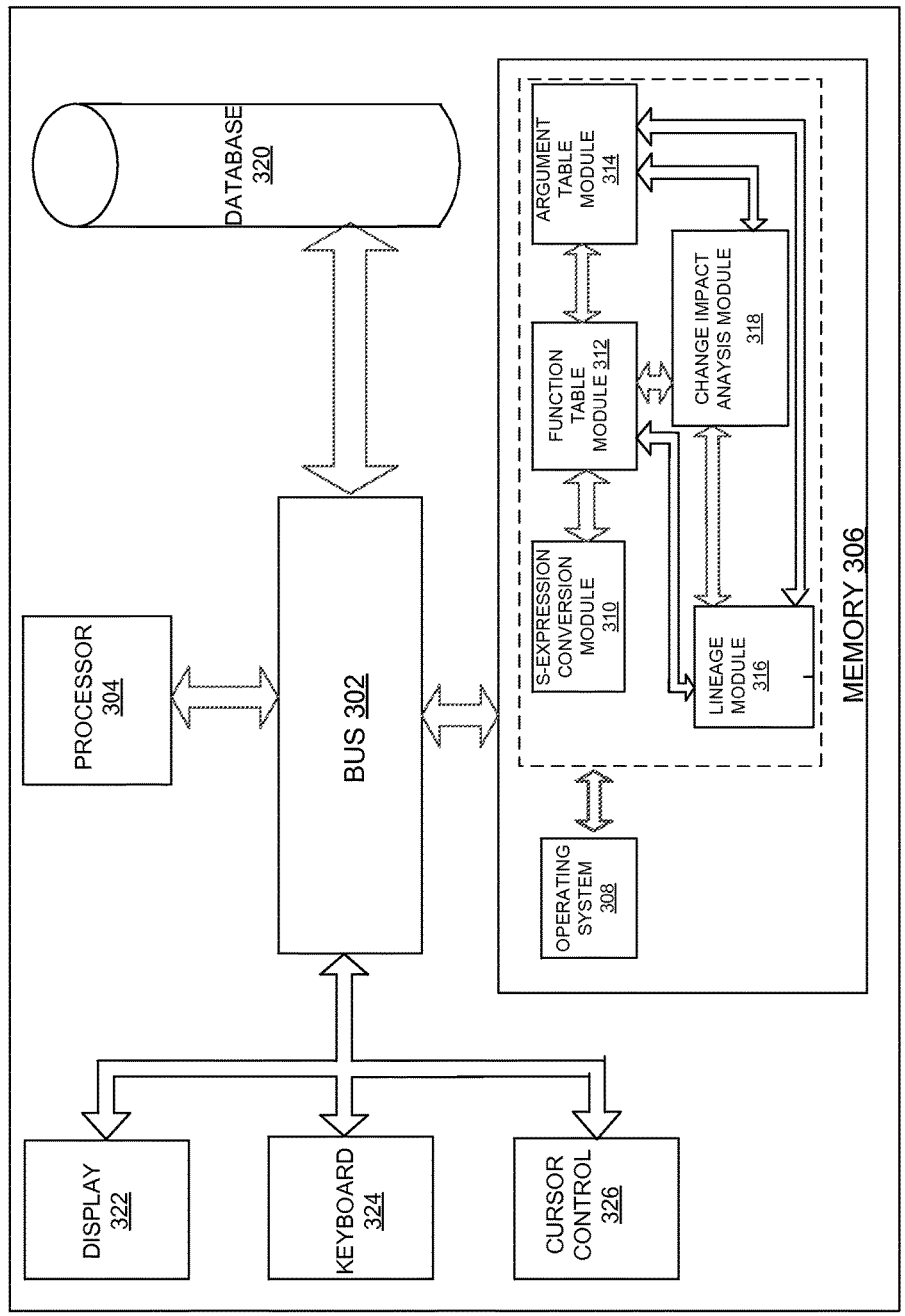
FIG. 3 is an exemplary block diagram representing a computer system in which various aspects of the present invention may be incorporated, in accordance with an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Typically in data integration systems, where data from one or more systems is combined to create a master data store or a data warehouse, SQL may be commonly employed to map source models to a target master data store or a warehouse model, and a series of mappings and transformations may be invoked to transform the data as it goes from the source to the destination. Various tools may be required to query the data from the destination master data store or warehouse using a target specification model which describes the destination data. In several scenarios, it may be necessary to understand data in a destination and to determine how a target entity or attribute is derived from a source entity and the process to determine that may be termed as identifying lineage.

Lineage provides a provenance of an entity or attribute from a source entity or a source attribute. Also in various scenarios, system designers may need to understand if an entity or attribute changes in the source and what is the impact of the change in a target destination model and the corresponding process involved is termed as Change Impact Analysis (CIA). More particularly, CIA is an analysis of an impact of a change in at least one of a source attribute, a source entity, an intermediate attribute or an intermediate entity to one or more downstream attributes or one or more downstream entities. In an exemplary scenario, lineage and CIA may be computed by storing metadata discretely with linkages. For example consider the following expressions:

$$R = MULT(P = SQUARE(Z = SUM(X,Y)), Q) \tag{1}$$

$$X' = SUM(1, SQRT(X)) \tag{2}$$

The information to be tracked to compute lineage and CIA for the above expression may be represented in the form of table depicted in FIG. 1. The table includes various columns 102-112. For computing Lineage the 'Derived From' column 104 may be recursively traversed. For example, in order to compute lineage of R (expression (1)), as indicated in the table, corresponding to the column 102 entry R the 'Derived From' column 104 entry is P,Q. Accordingly we need to track the 'Derived From Function' column 106 entry MULT(P,Q) and compute lineage for the 'Derived From' entities P and Q (of expression R) recursively. Considering that Q is a leaf level entity (as 'Derived From' 104 corresponding to Q is Null), the corresponding branch is terminated. The 'Derived From' 104 for P is Z so the 'Derived From Function' SQUARE(Z) needs to be tracked and lineage of Z needs to be recursively computed, the lineage of Z being SUM(X,Y) with X,Y being leaf level entities. The computed lineage of R is represented by the following expression (3):

$$R = MULT(P = (SQUARE(Z = SUM(X,Y)), Q). \tag{3}$$

Similarly for computing the CIA, the 'Contributes To' column 108 needs to be recursively traversed. For example, in order to compute the impact of changing X, from table 100 we determine that X contributes to Z and X'. X' is a root level entity as it does not contribute to anything, so the branch terminates and X' is computed from X as SUM (1, SQRT(X)). Z contributes to P and from table the 'Derived From' function 106 corresponding to P is SQUARE(Z) and contributes to R. The row corresponding to R in column 102 is traversed and stopped as R is a root level entity (since the 'Contributes to' column 108 corresponding to R is null) and R is MULT(P,Q). It is determined that X impacts X' and Z, P and R.

The 'Join Condition' column 112 of the table is for cases where transformations involve Joins, such as for example if T is defined based on a join of T1 and T2 and the expressions for T are computed from columns of T1 and T2 and the expression definition for columns of T if any would go into the 'Derived From Function' 106 and the 'Join Condition' 112 would have the where clause. For nested join such as for example a case where T2 itself is a join of T3 and T4, the joins would be recursively expanded, such that the columns of T2 would be derived from columns of T3 and T4 with the join condition being the join condition for T3×T4. The tabular structures represented in table of FIG. 1 could be pivoted to use 'Contributes To Function' 110 but as the function definition is needed when computing lineage, storing 'Derived From Function' 106 is preferred. Consider for example a nested join transformation as the following:

(SELECT MULT(T2.P, T1.Q) as R, SUM(1,SQRT (T2.X)) as X'
From T1 JOIN
(SELECT T3.X as X, SUM(T3.X,T4.Y) as Z, SQUARE (Z) as P FROM T3 JOIN T4
WHERE T3-T4 join condition) as T2
Where T1-T2 join condition) as T, The join conditions for the above nested join transformation is represented in tabular form in table 200 of FIG. 2. In an embodiment, in order to support computation of lineage and CIA, the 'Derived From' 204, 'Derived From Function' 206 and 'Contributes To' 208 is extracted and taken as inputs when entering maps and expressions through a user interface. However, the above described technique when implemented as a manual entry process could be cumbersome. Parsing structured query language (SQL) entered to extract the 'Derived From' 204, 'Derived From Function' 206 and 'Contributes To' 208 is an option but non trivial. Also in various data warehousing systems it may be required to convert SQL expressions entered in the warehouse tool to a dimensional model specification language of business intelligence (BI) tools that is supported for reporting and analysis that may render the process of computation of the lineage and CIA as described above all the way to the BI Tools entities and attributes to be furthermore complex. Also, due to the disparate metadata repositories across BI tool and extract transform load (ETL) tool the process of computation of lineage and CIA may be very complex.

Various embodiments of the systems and processor-implemented methods provided herein enable automatic conversion of SQL expression into S-expression tabular structure for facilitating computation of lineage and CIA using the S-expression tabular structure. In an embodiment, an SQL expression is converted into an S-expression tabular structure. As used herein the term "S-expression" refers to a nested list data structure, where each element of the nested list data structure is a list in itself and the "S-expression tabular structure" refers to a function and argument table based representation of the S-expression. A function table and an argument table are generated based on the S-expression and lineage and CIA is determined using the generated function table and the argument table.

FIG. 3 is a block diagram representing a computer system in which various aspects of the present invention may be incorporated. In an embodiment, the computer system includes a bus 302, a processor 304, a memory 306 including a plurality of modules and an operating system 308. The processor 304 is operatively coupled to the bus 302. Examples of the processor 304 may include, but is not limited to a general purpose processor, a specific purpose processor, and the like. The memory 306 may include, but is not limited to a random access memory, a read only memory, a static storage such as a magnetic storage or optical disc or any computer-readable medium. The computer-readable medium may include, but is not limited to a volatile medium, a non-volatile medium, a removable medium, a non-removable medium, a storage medium, and the like. Further, the computer readable medium can be any apparatus that can comprise, store, communicate, propagate, or transport the program for use by or in connection with the instruction execution system, apparatus, or device.

The computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, an optical disk, and the like. In an embodiment, the computer system may additionally include a database 320 operatively coupled to the processor 304 and configured to store data including logically related data records, system records, data files and the like Examples of the database 320 may include, but is not limited to an analytical database, a data warehouse, a distributed database, an external database, a navigational database, a real-time database, an in-memory database, a document oriented database, a relational database, an object oriented database, a data management workbench or any other database known in the art. In an embodiment, the computer system may additionally include a display 322, a keyboard 324, and/or a cursor control device 326.

In an embodiment, the plurality of modules include an S-expression conversion module 310, a function table module 312, an argument table module 314, a lineage module 316, and a change impact analysis module 318. In an embodiment, one or more of the plurality of modules may be operatively coupled or communicatively associated with one another (indicated by the bi-directional arrows between the modules in FIG. 3). In an embodiment, the S-expression conversion module 310 converts a SQL expression into an S-expression tabular structure. The conversion of SQL expression to S-expression and using the S-expression tabular structure as an intermediate format is simpler to manipulate and facilitates expression analysis. The S-expression conversion module 310 retrieves one or more keywords and one or more arguments associated with the SQL expression and generates a tabular representation of the one or more keywords and the one or more arguments. The tabular representation comprises one or more keywords and one or more arguments arranged at a plurality of levels comprising a lowest outermost level and a highest innermost level. The arrangement at the plurality of levels is based on a level of one or more keywords and one or more arguments in a syntax of the SQL expression.

FIG. 4 illustrates an exemplary tabular representation for converting SQL expression to S-expression. The tabular representation of FIG. 4 includes a plurality of levels ranging from L0 to L5 (402 to 414) and SQL keywords such as SELECT, FROM, WHERE, GROUP BY, JOIN, AS, AND, OR and HAVING arranged at various levels based on a level of one or more keywords and one or more arguments in a syntax of an SQL expression. The S-expression conversion module 310 traverses the tabular representation for grouping one or more arguments subsequent to a keyword at a level and prior to a subsequent keyword at the same level or a subsequent lower level from among the plurality of levels. Each SQL keyword (ex. SELECT, FROM, JOIN, WHERE, etc.) is treated as a function with whatever succeeds as arguments until we hit the next keyword at the same level. The S-expression conversion module 310 represents the grouped arguments as arguments of the keyword nested within a pair of parenthesis following the keyword. In an embodiment, the keyword is represented as a function with the one or more arguments, and upon the subsequent keyword being at the subsequent lower level, the keyword along with the nested arguments of the level are nested within another pair of parenthesis. In other words, the function arguments are nested functions with their own arguments and are processed in a way such that everything following the argument function name until the next keyword at the same or lower numbered level is an argument to the sub function. If a lower numbered level is reached then not only the argument function but the parent function as well is closed with a parenthesis. In an embodiment, prior to converting SQL expression to the tabular representation by relying on keyword leveling, a standard SQL parsing techniques may be used to parse SQL into a tree or in-memory objects to facilitate manipulation. Consider for example, an SQL expression (4):
(SELECT MULT (T2.P, T1.Q) as R, SUM(1,SQRT(T2.X)) as X'
From T1 JOIN
    (SELECT T3.X as X, SUM(T3.X,T4.Y) as Z, SQUARE (Z) as P FROM T3 JOIN T4 WHERE T3-T4 join condition) as T2
Where T1-T2 join condition) as T (4)
The above SQL expression may be converted into the following S-expression (5) tabular structure based on the above described technique (in FIG. 4):
(AS T (SELECT (AS R (MULT T2.P T1.Q)) (AS X' (SUM 1 (SQRT T2.X))))
    (FROM (JOIN T1 (AS T2 (SELECT (AS T2.X T3.X) (AS Z (SUM T3.X T4.Y)) (AS T2.P (SQUARE Z)))
    (FROM (JOIN T3 T4))
    (WHERE T3-T4 join condition)
    )
    )
    )
    (WHERE T1-T2 join condition))
)
    (5)
In the S-expression tabular structure (for example the one above), the whole expression is considered a list where every element in the list could itself be a list. So for example AS is the first element in the list and its argument is the alias T, and the SELECT, FROM, WHERE statements which are lists in themselves. In an embodiment, the S-expressions could be represented as an n-ary tree, where the first element in the list is the root and the following elements are its children, where the children themselves could be trees. A pre-order walk of the tree would give the original S-expression.

In an embodiment, the function table module 312 generates a function table based on the S-expression tabular structure. The function table includes a plurality of functions associated with the S-expression tabular structure tabulated against at least one of a function name, a derived column and a derived table. An example of the function table for the S-expression (5) tabular structure described above is illustrated in FIG. 5A. As illustrated in FIG. 5A, in the function table a plurality of functions with function identification (ids) are listed in the first column 502) and the corresponding function names such as AS, SELECT, MULT, SUM SQRT and the like corresponding to each of the functions F1 to F20 are listed in the column 'Function Name' 504. In an embodiment, the corresponding derived column for each function is listed in the 'Derived Column' 506 and the corresponding derived table for each function is listed in the 'Derived Table' Column 508.

In an embodiment, the argument table module 314 generates an argument table based on the S-expression tabular structure. The argument table includes a plurality of arguments associated with the S-expression tabular structure tabulated against at least one of an argument type, a function identifier linking the arguments to the function table, a computed from function, a reference to entity or a literal value. An example of the argument table for the S-expression (5) tabular structure described above is illustrated in FIGS. 5B-5C. As illustrated in the argument table of FIGS. 5B-5C, a plurality of arguments associated with the S-expression (such as A1-A39) are listed in the first column 514 and argument types such as 'Derived Table', 'Computed', 'Derived Column', 'Base Table', 'Base Column', 'Literal' and the like are listed in the 'Type' column 516 against the corresponding argument. Similarly function identifiers (F1 to F20) are listed along the 'Function id' column 518 for linking the arguments to the function table and the corresponding computed from functions are listed in the 'Computed From Function' column 520. Also, reference to entity or a literal value corresponding to each of the arguments is listed along 'Reference to entity' column 522 and 'literal value' column 524 respectively. Since each function can have many arguments the relationship between the function table and the argument table are one to many.

In an embodiment, in the S-Expression notation the first argument following the '(' is the function name and everything following till ')' are arguments to the function. So the first function AS is added to the function table with id "F1". The first argument to the AS function is the name of the Derived Table T which is a reference to an entity. The second, third and fourth arguments are SELECT, FROM and WHERE which are functions themselves and hence Computed. A function like MULT (F4) has both a Base Column T1.Q and a Derived Column T2.P as arguments. An argument which is not a function or a metadata entity is treated as a Literal, for example 1 which is an argument (A13) to SUM (F6). In an embodiment, functions may produce a Derived Column, if not the closest Derived Column it contributes are listed. For example, SQRT (F7) is notated as producing X' (alternately we could mandate an AS with each sub-function). Other functions produce a Derived Table for example AS and its arguments SELECT, FROM, WHERE.

In an embodiment, the lineage module 316 determines a lineage for an entity of the nested list data structure based on the function table and the argument table. In an embodiment, the lineage provides a provenance of the entity or an attribute from a source entity or a source attribute respectively. In an embodiment, in order to determine the lineage, the lineage module 316 computes a lineage list for a derived column. The lineage list for the derived column is computed by first generating a pivoted function table. In an embodiment, pivoted function table includes one or more derived columns tabulated against corresponding one or more functions contributing to the one or more derived columns excluding a first function that defines the one or more derived columns. An example of the pivoted function table generated for the S-expression (5) tabular structure described above is depicted in FIG. 6.

In an embodiment, the lineage module 316 determines from the pivoted function table one or more functions contributing to the derived column that the lineage list is to be computed for. Further, the lineage module 316, determines one or more arguments corresponding to the one or more functions from the argument table (such as that of FIG. 5B), where a reference to entity corresponding to the one or more arguments is not null. In an embodiment, the lineage module 316, augments the lineage list with one or more base columns from among the arguments contributing to the lineage list. The lineage module 316 augments the lineage list with one or more derived columns contributing to the lineage list and recursively computes the lineage list of the one or more derived columns contributing to the lineage list by above described steps. In an embodiment, the lineage module 316 also augments the lineage list with the recursively computed lineage list of one or more derived columns. In other words, to compute the list of columns in lineage for a derived column the Pivoted Function Table is queried for functions contributing to the Derived Column and then the Argument table is queried for those functions ('Function Id') arguments where the 'Reference to Entity' is Non Null, such that those entities contribute to that derived column. If some or all of the Entities are not Base columns their definition is recursively traversed in the Function/Argument table until only base entities remain so that the complete list of columns in the lineage list is identified.

An example code/executable instruction for computing the lineage list executable by the lineage module 316 is as below:

```
Compute Lineage List (Input Column IC, Output Lineage
   List LL)
{
   Select 'Function List' as FL from 'Pivoted Function
      Table' where 'Derived Column'=IC
   For each function FId in FL
   {
      /* Augment list with contributing Base Columns */
      For each RE_BC in (Select 'Reference To Entity'
         RE_BC from 'Argument Table' where 'Function
         Id'=FId and 'Type'='Base Column')
         LL=LL+RE_BC
      /* Augment list with contributing Derived Columns
         and recursively add their lineage */
      For each RE_DC in (Select 'Reference To Entity'
         RE_DC from 'Argument Table' where 'Function
         Id'=FId and 'Type'='Derived Column')
         LL=LL+RE_DC
         Compute Lineage List (RE_DC, LL) /* LL is
            appended to */
   }
}
```

In an embodiment, the lineage module 316, computes a lineage expression for a column. In order to compute the lineage expression for the column, the lineage module 316 identifies a first function of the function table including the column defined therein that the lineage expression is to be computed for. The lineage module 316 processes one or more arguments associated with the identified first function excluding the column. The arguments may include one or more computed function arguments, one or more literal values, one or more base columns, and/or one or more derived columns. In an embodiment, the arguments are processed by a) appending values of the literal values and/or a reference to entity corresponding to the base columns to the lineage expression, b) augmenting the lineage expression with a lineage expression of the one or more derived columns by recursively computing the lineage expression for the derived columns by repeating steps of identifying the first function and processing arguments as described above for the derived columns, and c) appending the lineage expression for the computed function arguments by invoking a sub function for the one or more computed function arguments.

In an embodiment, the process of invoking the sub-function involves a) appending names of the one or more sub-functions to the lineage expression and b) processing one or more sub-function arguments, where one or more sub-function arguments comprises one or more computed function arguments, one or more literal values, one or more base columns, and/or one or more derived columns. The processing of the sub-function arguments may involve appending values of the literal values and the one or more base columns of the one or more sub-functions to the lineage expression. In an embodiment, the processing of the sub-function arguments may also involve appending the lineage expression for the one or more computed function arguments by invoking the sub function for the one or more computed function arguments and augmenting the lineage expression with a lineage expression of the derived column by recursively computing a lineage expression computation for the derived columns. An example code for computing the lineage expression executable by the lineage module 316 is as below:

```
Compute Full Lineage Expression (Input Column IC,
   Output Lineage Expression LE)
{
   /* Locate the AS function that IC is defined */
   Select 'Function Id' FId from 'Function Table' where
      'Function Name'='AS' and 'Derived Column'=IC
   If (FId is NOT NULL) /* Derived Column not a Base
      Column */
   {
      LE=LE+IC+'='
      /* Process arguments of AS, other than the column we
         are computing lineage for */
      For each record in (Select * from 'Argument Table'
         where 'Function Id'=FId and 'Reference to Entity'
         !=IC)
      {
         If Type='Computed' then Process Sub Function
            ('Function Id', LE) /* LE is appended */
         If Type='Literal' then LE=LE+'Literal Value'
         If Type='Base Column' then LE=LE+'Reference To
            Entity'
         If Type='Derived Column' then Compute Full Lineage Expression ('Reference To Entity', LE) /* LE
            is augmented with Derived Column expansion */
      }
   }
   else LE=IC /* Base column has no lineage */
}
/* Helper invoked for Sub Function's */
Process Sub Function (Input Function FId, Output Lineage Expression LE)
{
   Select 'Function Name' FN from 'Function Table'
      where 'Id'=FId
```

```
/* Append Sub Function Name */
LE=LE+FN+'('
/* Process sub function arguments */
For each record in (Select * from 'Argument Table'
    where 'Function Id'=FId)
{
    If Type='Computed' then Process Sub Function
        ('Function Id', LE) /* LE is appended */
    If Type='Literal' then LE=LE+'Literal Value'
    If Type='Base Column' then LE=LE+'Reference To
        Entity'
    If Type='Derived Column' then Compute Full Lin-
        eage Expression ('Reference To Entity', LE) /* LE
        is augmented with Derived Column expansion */
    If (record is Last Argument) then LE=LE+')' else
        LE=LE+','
}
}
```

In an embodiment, the lineage module 316 also computes a lineage list for a table. In an embodiment, in order to compute lineage list for the table, the lineage module 316, identifies one or more arguments of a FROM function associated with the table that the lineage list is to be computed for, where the arguments of the FROM function include one or more base tables, and/or one or more computed function arguments including at least one of one or more derived tables and one or more join clauses. Further, the lineage module 316 augments the lineage list with one or more identified base tables and with one or more computed function arguments contributing to the lineage list.

In an embodiment, the augmenting of the lineage list with one or more computed function arguments involves obtaining a derived table name from among the derived tables from the argument table, recursively computing a lineage list associated with the derived table name. For derived tables the lineage list is augmented with the recursively computed lineage list associated with the derived table name, upon the computed function arguments including one or more derived tables. In case of join clauses the lineage list is augmented with one or more base tables associated with the join clauses and recursively computing a lineage list associated with one or more derived tables associated with the join clauses and augmenting the lineage list with the recursively computed lineage list associated with the one or more derived tables, upon the computed function arguments including the one or more join clause arguments.

An example code for computing the lineage list of a table executable by the lineage module 316 is as below:

```
Compute Table Lineage List (Input Table IT, Output
    Lineage List LL)
{
/* In SQL only FROM clause can have contributing
    tables, so we start with FROM function defining IT */
Select 'Id' from 'Function Table' where 'Derived
    Table'=IT and 'Function Name'='FROM'
/* FROM clause can have Base table, Derived table or
    Joins. Base tables are directly added to lineage list,
    Derived tables and Join would show up as Computed
    functions and we need to drill into their arguments. */
/* Augment list with contributing Base Tables */
For each RE in (Select 'Reference To Entity' RE from
    'Argument Table' where 'Function Id'=Id and
    'Type'='Base Table')
    LL=LL+RE
/* Augment list with contributing Computed functions
    which could be AS (Derived Tables) or Joins */
For each FromCF in (Select 'Computed From Function'
    FromCF from 'Argument Table' where 'Function
    Id'=Id and 'Type'='Computed')
{
    Select 'Function Name' FN from 'Function Table'
        where 'Id'=FromCF
    If (FN='AS')
    {
        /* For AS add Derived Table name and its lineage list
            by recursively computing it */
        Select 'Reference To Entity' RE_DT from 'Argu-
            ment Table' where 'Function Id'=FromCF and
            'Type'='Derived Table'
        LL=LL+RE_DT
        Compute Table Lineage List (RE_DT, LL) /* LL is
            appended to */
    }
    If (FN='JOIN')
    {
        /* For JOIN add any Base Table arguments, and
            process any AS (Derived Tables) arguments */
        For each RE_BT in (Select 'Reference To Entity'
            RE_BT from 'Argument Table' where 'Function
            Id'=FromCF and 'Type'='Base Table')
            LL=LL+RE_BT
        For each JoinCF in (Select 'Computed From Func-
            tion' JoinCF from 'Argument Table' where 'Func-
            tion Id'=FromCF and 'Type'='Computed')
        {
            /* For AS add Derived Table name and its lineage
                list by recursively computing it */
            Select 'Reference To Entity' RE_DT from 'Argu-
                ment Table' where 'Function Id'=JoinCF and
                'Type'='Derived Table'
            LL=LL+RE_DT
            Compute Table Lineage List (RE_DT, LL) /* LL
                is appended to */
        }
    }
}
}
```

In an embodiment, the generated function table and the argument table may also be used to determine change impact analysis. The change impact analysis module 318 determines a change impact analysis (CIA) for an entity based on the function table and the argument table. As used herein the term "change impact analysis" is construed as referring to an analysis of an impact of a change in at least one of a source attribute, a source entity, an intermediate attribute or an intermediate entity to one or more downstream attributes or one or more downstream entities. In order to determine the CIA for the entity, the change impact analysis module 318 computes a list of columns impacted by change in an entity by generating a pivoted argument table including a plurality of entities tabulated against corresponding function list that each of the plurality of entities contributes to, comprising a parent function for derived tables.

An exemplary pivoted argument table is depicted in FIG. 7. The change impact analysis module 318 retrieves a function list contributed by the entity from the generated pivoted argument table. Further, for each function of the function list, change impact analysis module 318 a) determines a derived column from the function table for the function, b) augments the list of columns impacted by the change to the entity with the derived column, c) determines if the derived column occurs in the pivoted argument table and d) recursively retrieves a function list contributed by the derived column determined to be occurring in the pivoted argument table and for each function of the function list contributed by the derived column by repeating steps a) to d). The retrieval is performed for each function list except for one or more root level derived columns devoid of the function list in the pivoted argument table.

In other words, to compute list of columns impacted by an entity the 'Pivoted Argument Table' is checked to retrieve the Function List the entity contributes to and for each Function the 'Derived Column' is determined from the Functions table. Further, it is recursively checked if the 'Derived Column' occurs in the 'Pivoted Argument Table' and if so the 'Function List' it contributes to, is retrieved. The process is repeated for each function in the list until only root level Derived columns are remaining that do not include a 'Function List' entry in the 'Pivoted Argument Table'. The entire list of Derived columns identified are the ones impacted by any change to the input Entity. An example code executable by the change impact analysis module 318 for computing a list of columns impacted by change in an entity is as below:

Compute CIA Column List (Input Column IC, Output List L)
{
Select 'Function List' FL from 'Pivoted Argument Table' where 'Entity'=IC
For each Function F in FL
{
  Select 'Derived Column' DC from 'Function Table'
  L=L+DC
  /* Check if the Derived Column contributes to other Derived Columns */
  If Not Null (Select 'Function List' from 'Pivoted Argument Table' where 'Entity'=DC) then
  Compute CIA Column List (DC, L)
}
}

The change impact analysis module 318 also computes an expression for change impact analysis for the entity by invoking a computation of lineage expression on each member of the computed list of columns impacted by the change to the entity or on a plurality of root entities of the computed list of columns computing an expression for the change impact analysis based on the computed lineage expression.

In an embodiment, the change impact analysis module 318 computes a change impact analysis table list by a) selecting a function list from the pivoted argument table for the entity, b) selecting a derived table from the function table corresponding to a function in the selected function list, c) adding the derived table to the change impact analysis table list, d) determining if the selected derived table contributes to one or more other derived tables from the pivoted argument table, e) upon determining that the derived table contributes to one or more other derived tables repeating the steps a) to e) for the derived table, and f) computing the change impact analysis table list based on iteratively performing steps b) to e) for a plurality of functions in the function list. An example code executable by the change impact analysis module 318 for computing a change impact analysis table list is as below:

Compute CIA Table List (Input Table IT, Output List L)
{
Select 'Function List' FL from 'Pivoted Argument Table' where 'Entity'=IT
For each Function F in FL
{
  Select 'Derived Table' DT from 'Function Table'
  L=L+DT
  /* Check if the Derived Table contributes to other Derived Tables */
  If Not Null (Select 'Function List' from 'Pivoted Argument Table' where 'Entity'=DT) then
  Compute CIA Table List (DT, L)
}
}

Figure 8:
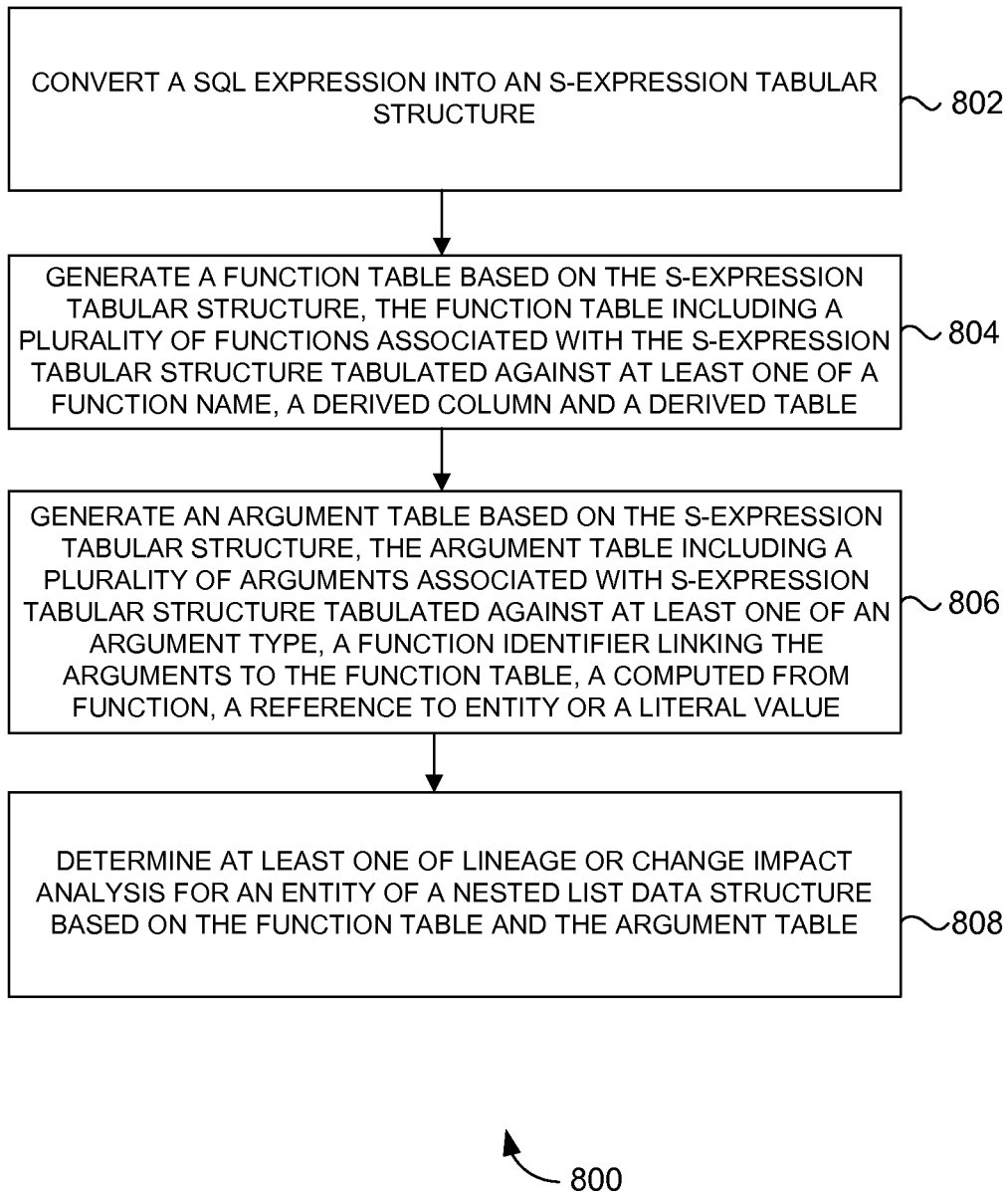
FIG. 8 depicts a flow chart illustrating a processor-implemented method of S-expression based computation of lineage and change impact analysis, in accordance with an embodiment.

FIG. 8 depicts a flow chart 800 illustrating a processor-implemented method of S-expression based computation of lineage and change impact analysis, in accordance with an embodiment. In step 802, a SQL expression is converted (for example, using S-expression conversion module 310 of FIG. 3) into an S-expression tabular structure. In an embodiment, the S-expression tabular structure models a nested list data structure, where each element of the nested list data structure could be a list in itself. The process of conversion of SQL expression into S-expression is described in details along with FIG. 4 and is not repeated here for the sake of brevity. In an embodiment, at step 804, a function table is generated (for example, using a function table module 312 of FIG. 3) based on the S-expression. An example of the function table is depicted in FIG. 5A. In an embodiment, the function table includes a plurality of functions associated with the S-expression tabular structure tabulated against at least one of a function name, a derived column and a derived table. At step 806, an argument table is generated based on the S-expression, such that the argument table includes a plurality of arguments associated with the S-expression tabular structure tabulated against at least one of an argument type, a function identifier linking the arguments to the function table, a computed from function, a reference to entity or a literal value. An example of the argument table is depicted in FIGS. 5B-5C.

In an embodiment, at step 808, at least one of lineage or change impact analysis is determined (for example using a lineage module 316 or a change impact analysis module 318 respectively) for an entity of the nested list data structure based on the function table and the argument table. The lineage provides a provenance of the entity or attribute from a source entity or a source attribute. The change impact analysis is an analysis of an impact of a change in at least one of a source attribute, a source entity, an intermediate attribute or an intermediate entity to one or more downstream attributes or one or more downstream entities. The process of computation of lineage is described herein in detail along with FIG. 6 and the process of computation of change impact analysis is described herein in detail along with FIG. 7 is not repeated here for the sake of brevity.

Various systems and processor-implemented methods and systems disclosed herein auto map SQL expression to S-expression tabular structure for representing those S-expression tabular structure in relational tables for facilitating computation of lineage and change impact analysis using the relational tables. The S-expression is easier to programmatically decompose, understand and manipulate expressions and reconstruct expressions back when compared to SQL expression and the systems and methods described herein facilitate easier, automatic and less complex computation of lineage and change impact analysis based on S-expression tabular structure.

Also, various embodiments of the methods and systems disclosed herein facilitate determining lineage of BI Tool (ex. MicroStrategy) entities and attributes and determining change impact analysis from source or intermediate entities all the way to BI tool entities and attributes, by leveraging linkage in the metadata between source entities/attributes, intermediate entities/attributes and BI tool entities and attributes. Further, various embodiments of the methods and systems disclosed herein facilitate creating BI Tool (ex. MicroStrategy) expressions via metadata stored as S-expressions and programmatically tracking of the link (lineage or CIA) between BI tool entity/attributes and intermediate entity/attributes associated with an SQL expression, thereby enabling application of the technique to BI tool entities and attributes, that typically have disparate metadata repositories in an easily implementable manner.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions, which when executed by one or more processors, causes:
   converting a SQL expression into an S-expression tabular structure, wherein said S-expression tabular structure comprises a nested list data structure, wherein each element of said nested list data structure is a list in itself, and wherein said SQL expression is converted to the nested list data structure using a functional notation for the SQL expression, with SQL keywords at a plurality of levels of the SQL expression serving as function keywords, and each list of the nested list representation comprising the SQL keywords followed by arguments from the functional notation for the SQL expression;
   generating a function table based on said S-expression tabular structure, wherein said function table comprises a plurality of functions associated with said S-expression tabular structure tabulated against at least one of a function name, a derived column, and a derived table;
   generating an argument table based on said S-expression tabular structure, wherein said argument table comprises a plurality of arguments associated with said S-expression tabular structure tabulated against at least one of an argument type, a function identifier linking the arguments to the function table, a computed from function, a reference to entity or a literal value;
   determining at least one of lineage or change impact analysis for an entity of said nested list data structure based on said function table and said argument table by computing a lineage list for a derived column by generating a pivoted function table which is a map of derived columns to functions contributing to derived columns, and by computing a change impact analysis list by computing a pivoted argument table which is a map of entities and functions to which they contribute, wherein said lineage provides a provenance of said entity or attribute from a source entity or a source attribute, and wherein said change impact analysis is an analysis of an impact of a change in at least one of a source attribute, a source entity, an intermediate attribute or an intermediate entity to one or more downstream attributes or one or more downstream entities; and
   creating a computer-generated model run on a computer based on at least one of the lineage or change impact analysis,
   wherein said S-expression tabular structure improves a programming of the computer-generated model run on the computer compared to the SQL expression by programmatically decomposing, understanding, and manipulating programming expressions and reconstructing the expressions, and
   wherein said S-expression tabular structure reduces a computational complexity of the lineage or change impact analysis.

2. The one or more non-transitory computer readable storage mediums of claim 1, wherein said determining of said lineage comprises computing said lineage list for said derived column by:
   a) generating said pivoted function table comprising one or more derived columns tabulated against corresponding one or more functions contributing to said one or more derived columns excluding a first function that defines said one or more derived columns;

b) determining from said pivoted function table one or more functions contributing to said derived column that said lineage list is to be computed for and determining from said argument table one or more arguments corresponding to said one or more functions, wherein a reference to entity corresponding to said one or more arguments is not null;

c) augmenting said lineage list with one or more base columns from among said one or more arguments contributing to said lineage list;

d) augmenting said lineage list with one or more derived columns contributing to said lineage list and recursively computing said lineage list of said one or more derived columns contributing to said lineage list by repeating steps b) to d); and e) augmenting said lineage list with said recursively computed lineage list of said one or more derived columns.

3. The one or more non-transitory computer readable storage mediums of claim 1, wherein determining said lineage further comprises computing a lineage expression for a column by:

i) identifying a first function of said function table comprising said column defined therein that said lineage expression is to be computed for; and ii) processing one or more arguments associated with said identified first function excluding said column, wherein said one or more arguments comprises at least one of one or more computed function arguments, one or more literal values, one or more base columns, or one or more derived columns, by performing at least one of:

a) appending values of at least one of said one or more literal values or a reference to entity corresponding to said one or more base columns to said lineage expression;

b) augmenting said lineage expression with a lineage expression of said one or more derived columns by recursively computing said lineage expression for said one or more derived columns by repeating steps i) and ii) for said derived columns; and c) appending said lineage expression for said one or more computed function arguments by invoking a sub function for said one or more computed function arguments.

4. The one or more non-transitory computer readable storage mediums of claim 3, wherein said invoking said sub-function comprises:

appending names of said one or more sub-functions to said lineage expression; and processing one or more sub-function arguments, wherein said one or more sub-function arguments comprises at least one of computed function arguments or one or more literal values, or one or more base columns, or one or more derived columns, by performing at least one of:

appending values of said literal values and said one or more base columns of said one or more sub-functions to said lineage expression;

appending said lineage expression for said one or more computed function arguments by invoking said sub function for said one or more computed function arguments; and augmenting said lineage expression with a lineage expression of said derived column by recursively computing a lineage expression computation for said derived columns.

5. The one or more non-transitory computer readable storage mediums of claim 1, wherein said determining said lineage further comprises computing a lineage list for a table by:

identifying one or more arguments of a FROM function associated with said table that said lineage list is to be computed for, wherein said one or more arguments of said FROM function comprising at least one of one or more base tables, or one or more computed function arguments comprising at least one of one or more derived tables and one or more join clauses;

augmenting said lineage list with said one or more identified base tables; and augmenting said lineage list with said one or more computed function arguments contributing to said lineage list by:

obtaining a derived table name from among said one or more derived tables from said argument table, recursively computing a lineage list associated with said derived table name, and augmenting said lineage list with said recursively computed lineage list associated with said derived table name, upon said computed function arguments comprising said one or more derived tables; and augmenting said lineage list with one or more base tables associated with said join clauses and recursively computing a lineage list associated with one or more derived tables associated with said join clauses and augmenting said lineage list with said recursively computed lineage list associated with said one or more derived tables, upon said computed function arguments comprising said one or more join clause arguments.

6. The one or more non-transitory computer readable storage mediums of claim 1, wherein determining said change impact analysis comprises computing a list of columns impacted by change in an entity by:

generating a pivoted argument table comprising a plurality of entities tabulated against corresponding function list that each of said plurality of entities contributes to, comprising a parent function for derived tables; and retrieving a function list contributed by said entity from said generated pivoted argument table and performing for each function of said function list:

a) determining a derived column from said function table for said function;

b) augmenting said list of columns impacted by said change to said entity with said derived column;

c) determining if said derived column occurs in said pivoted argument table; and d) recursively retrieving a function list contributed by said derived column determined to be occurring in said pivoted argument table and for each function of said function list contributed by said derived column repeating steps a) to d), wherein said retrieval is performed for each function list except for one or more root level derived columns devoid of said function list in said pivoted argument table.

7. The one or more non-transitory computer readable storage mediums of claim 6, further comprising computing an expression for change impact analysis for said entity by:

invoking a computation of lineage expression on each member of said computed list of columns impacted by said change to said entity or on a plurality of root entities of said computed list of columns; and computing an expression for said change impact analysis based on said computed lineage expression.

8. The one or more non-transitory computer readable storage mediums of claim 6, further comprising computing a change impact analysis table list by:
   a) selecting a function list from said pivoted argument table for said entity;
   b) selecting a derived table from said function table corresponding to a function in said selected function list;
   c) adding said derived table to said change impact analysis table list;
   d) determining if said selected derived table contributes to one or more other derived tables from said pivoted argument table;
   e) upon determining that said derived table contributes to one or more other derived tables repeating said steps a) to e) for said derived table; and
   f) computing said change impact analysis table list based on iteratively performing steps b) to e) for a plurality of functions in said function list.

9. The one or more non-transitory computer readable storage mediums of claim 1, wherein converting said SQL expression into an S-expression tabular structure comprises:
   retrieving one or more keywords and one or more arguments associated with said SQL expression;
   generating a tabular representation of said one or more keywords and said one or more arguments, wherein said tabular representation comprises said one or more keywords and said one or more arguments arranged at a plurality of levels comprising a lowest outermost level and a highest innermost level, based on a level of said one or more keywords and said one or more arguments in a syntax of said SQL expression; and
   generating said S-expression tabular structure by traversing said tabular representation and grouping one or more arguments subsequent to a keyword at a level from among said plurality of levels and prior to a subsequent keyword at said level or a subsequent lower level from among said plurality of levels,
   wherein said grouped one or more arguments are represented as arguments of said keyword nested within a pair of parenthesis following said keyword, wherein said keyword is represented as a function with said one or more arguments, and wherein upon said subsequent keyword being at said subsequent lower level, said keyword along with said nested arguments of said level are nested within another pair of parenthesis.

10. A system comprising:
   a processor; and
   a non-transitory computer readable storage medium comprising one or more modules executable by said processor, wherein said one or more modules comprises:
      an S-expression conversion module for converting a SQL expression into an S-expression tabular structure, wherein said S-expression tabular structure comprises a nested list data structure, wherein each element of said nested list data structure is a list in itself, and wherein said SQL expression is converted to the nested list data structure using a functional notation for the SQL expression, with SQL keywords at a plurality of levels of the SQL expression serving as function keywords, and each list of the nested list representation comprising the SQL keywords followed by arguments from the functional notation for the SQL expression;
      a function table module for generating a function table based on said S-expression, wherein said function table comprises a plurality of functions associated with said S-expression tabular structure tabulated against at least one of a function name, a derived column and a derived table;
      an argument table module for generating an argument table based on said S-expression, wherein said argument table comprises a plurality of arguments associated with said S-expression tabular structure tabulated against at least one of an argument type, a function identifier linking the arguments to the function table, a computed from function, a reference to entity or a literal value;
      a lineage module for determining a lineage for an entity of said nested list data structure based on said function table and said argument table by computing a lineage list for a derived column by generating a pivoted function table which is a map of derived columns to functions contributing to derived columns, wherein said lineage provides a provenance of said entity or an attribute from a source entity or a source attribute respectively;
      a change impact analysis module for determining a change impact analysis for said entity based on said function table and said argument table by computing a change impact analysis list by computing a pivoted argument table which is a map of entities and functions to which they contribute, wherein said change impact analysis is an analysis of an impact of a change in at least one of a source attribute, a source entity, an intermediate attribute or an intermediate entity to one or more downstream attributes or one or more downstream entities; and
      a computer-generated model run on a computer based on at least one of the lineage or change impact analysis,
   wherein said S-expression tabular structure improves a programming of the computer-generated model run on the computer compared to the SQL expression by programmatically decomposing, understanding, and manipulating programming expressions and reconstructing the expressions, and
   wherein said S-expression tabular structure reduces a computational complexity of the lineage or change impact analysis.

11. The system of claim 10, wherein said lineage module is further configured to:
   a) generate said pivoted function table comprising one or more derived columns tabulated against corresponding one or more functions contributing to said one or more derived columns excluding a first function that defines said one or more derived columns;
   b) determine from said pivoted function table one or more functions contributing to said derived column that said lineage list is to be computed for and determining from said argument table one or more arguments corresponding to said one or more functions, wherein a reference to entity corresponding to said one or more arguments is not null;
   c) augment said lineage list with one or more base columns from among said one or more arguments contributing to said lineage list;

d) augment said lineage list with one or more derived columns contributing to said lineage list and recursively computing said lineage list of said one or more derived columns contributing to said lineage list by repeating steps b) to d); and
e) augment said lineage list with said recursively computed lineage list of said one or more derived columns.

12. The system of claim 10, wherein said lineage module is further configured to compute a lineage expression for a column by:
  i) identifying a first function of said function table comprising said column defined therein that said lineage expression is to be computed for; and
  ii) processing one or more arguments associated with said identified first function excluding said column, wherein said one or more arguments comprises at least one of one or more computed function arguments, one or more literal values, one or more base columns, or one or more derived columns, by performing at least one of:
    a) appending values of at least one of said one or more literal values or a reference to entity corresponding to said one or more base columns to said lineage expression;
    b) augmenting said lineage expression with a lineage expression of said one or more derived columns by recursively computing said lineage expression for said one or more derived columns by repeating steps i) and ii) for said derived columns; and
    c) appending said lineage expression for said one or more computed function arguments by invoking a sub function for said one or more computed function arguments.

13. The system of claim 12, wherein said lineage module is further configured to:
  append names of said one or more sub-functions to said lineage expression; and
  process one or more sub-function arguments, wherein said one or more sub-function arguments comprises at least one of computed function arguments or one or more literal values, or one or more base columns, or one or more derived columns, by performing at least one of:
    append values of said literal values and said one or more base columns of said one or more sub-functions to said lineage expression;
    append said lineage expression for said one or more computed function arguments by invoking said sub function for said one or more computed function arguments; and
    augment said lineage expression with a lineage expression of said derived column by recursively computing a lineage expression computation for said derived columns.

14. The system of claim 10, wherein said lineage module is further configured to compute a lineage list for a table by:
  identifying one or more arguments of a FROM function associated with said table that said lineage list is to be computed for, wherein said one or more arguments of said FROM function comprising at least one of one or more base tables, or one or more computed function arguments comprising at least one of one or more derived tables and one or more join clauses;
  augmenting said lineage list with said one or more identified base tables; and
  augmenting said lineage list with said one or more computed function arguments contributing to said lineage list by:
    obtaining a derived table name from among said one or more derived tables from said argument table, recursively computing a lineage list associated with said derived table name, and augmenting said lineage list with said recursively computed lineage list associated with said derived table name, upon said computed function arguments comprising said one or more derived tables; and
    augmenting said lineage list with one or more base tables associated with said join clauses and recursively computing a lineage list associated with one or more derived tables associated with said join clauses and augmenting said lineage list with said recursively computed lineage list associated with said one or more derived tables, upon said computed function arguments comprising said one or more join clause arguments.

15. The system of claim 10, wherein said change impact analysis module is further configured to compute a list of columns impacted by change in an entity by:
  generating said pivoted argument table comprising a plurality of entities tabulated against corresponding function list that each of said plurality of entities contributes to, comprising a parent function for derived tables;
  retrieving a function list contributed by said entity from said generated pivoted argument table and performing for each function of said function list:
    a) determining a derived column from said function table for said function;
    b) augmenting said list of columns impacted by said change to said entity with said derived column;
    c) determining if said derived column occurs in said pivoted argument table; and
    d) recursively retrieving a function list contributed by said derived column determined to be occurring in said pivoted argument table and for each function of said function list contributed by said derived column repeating steps a) to d), wherein said retrieval is performed for each function list except for one or more root level derived columns devoid of said function list in said pivoted argument table.

16. The system of claim 10, wherein said change impact analysis module is further configured to:
  invoke a computation of lineage expression on each member of said computed list of columns impacted by said change to said entity or on a plurality of root entities of said computed list of columns; and
  compute an expression for said change impact analysis based on said computed lineage expression.

17. The system of claim 10, wherein said change impact analysis module is further configured to compute a change impact analysis table list by:
  a) selecting a function list from said pivoted argument table for said entity;
  b) selecting a derived table from said function table corresponding to a function in said selected function list;
  c) adding said derived table to said change impact analysis table list;
  d) determining if said selected derived table contributes to one or more other derived tables from said pivoted argument table;
  e) upon determining that said derived table contributes to one or more other derived tables repeating said steps a) to e) for said derived table; and f) computing said change impact analysis table list based on iteratively performing steps b) to e) for a plurality of functions in said function list.

18. The system of claim 10, wherein said S-expression conversion module is configured to:
retrieve one or more keywords and one or more arguments associated with said SQL expression;
generate a tabular representation of said one or more keywords and said one or more arguments, wherein said tabular representation comprises said one or more keywords and said one or more arguments arranged at a plurality of levels comprising a lowest outermost level and a highest innermost level, based on a level of said one or more keywords and said one or more arguments in a syntax of said SQL expression; and
generate said S-expression tabular structure by traversing said tabular representation and grouping one or more arguments subsequent to a keyword at a level from among said plurality of levels and prior to a subsequent keyword at said level or a subsequent lower level from among said plurality of levels,
wherein said grouped one or more arguments are represented as arguments of said keyword nested within a pair of parenthesis following said keyword, wherein said keyword is represented as a function with said one or more arguments, and wherein upon said subsequent keyword being at said subsequent lower level, said keyword along with said nested arguments of said level are nested within another pair of parenthesis.

19. A processor-implemented method comprising:
converting a SQL expression into an S-expression tabular structure, wherein said S-expression tabular structure comprises a nested list data structure, and wherein each element of said nested list data structure is a list in itself, and wherein said SQL expression is converted to the nested list data structure using a functional notation for the SQL expression, with SQL keywords at a plurality of levels of the SQL expression serving as function keywords, and each list of the nested list representation comprising the SQL keywords followed by arguments from the functional notation for the SQL expression;
generating a function table based on said S-expression tabular structure, wherein said function table comprises a plurality of functions associated with said S-expression tabular structure tabulated against at least one of a function name, a derived column, and a derived table;
generating an argument table based on said S-expression tabular structure, wherein said argument table comprises a plurality of arguments associated with said S-expression tabular structure tabulated against at least one of an argument type, a function identifier linking the arguments to the function table, a computed from function, a reference to entity or a literal value; and
determining at least one of lineage or change impact analysis for an entity of said nested list data structure based on said function table and said argument table by computing a lineage list for a derived column by generating a pivoted function table which is a map of derived columns to functions contributing to derived columns, and by computing a change impact analysis list by computing a pivoted argument table which is a map of entities and functions to which they contribute, wherein said lineage provides a provenance of said entity or attribute from a source entity or a source attribute, and wherein said change impact analysis is an analysis of an impact of a change in at least one of a source attribute, a source entity, an intermediate attribute or an intermediate entity to one or more downstream attributes or one or more downstream entities; and
creating a computer-generated model run on a computer based on at least one of the lineage or change impact analysis,
wherein said S-expression tabular structure improves a programming of the computer-generated model run on the computer compared to the SQL expression by programmatically decomposing, understanding, and manipulating programming expressions and reconstructing the expressions, and
wherein said S-expression tabular structure reduces a computational complexity of the lineage or change impact analysis.

20. The processor-implemented method of claim 19, wherein said converting comprises:
retrieve one or more keywords and one or more arguments associated with said SQL expression;
generate a tabular representation of said one or more keywords and said one or more arguments, wherein said tabular representation comprises said one or more keywords and said one or more arguments arranged at said plurality of levels comprising a lowest outermost level and a highest innermost level, based on a level of said one or more keywords and said one or more arguments in a syntax of said SQL expression; and
generate said S-expression tabular structure by traversing said tabular representation and grouping one or more arguments subsequent to a keyword at a level from among said plurality of levels and prior to a subsequent keyword at said level or a subsequent lower level from among said plurality of levels,
wherein said grouped one or more arguments are represented as arguments of said keyword nested within a pair of parenthesis following said keyword, wherein said keyword is represented as a function with said one or more arguments, and wherein upon said subsequent keyword being at said subsequent lower level, said keyword along with said nested arguments of said level are nested within another pair of parenthesis.

* * * * *